United States Patent [19]

Andrzejewski et al.

[11] Patent Number: 5,038,521
[45] Date of Patent: Aug. 13, 1991

[54] SEALING STRIPS

[75] Inventors: Heinz Andrzejewski; Helmut Ginster, both of Viersen, Fed. Rep. of Germany

[73] Assignee: Draftex Industries Limited, Edingburgh, Scotland

[21] Appl. No.: 538,921

[22] Filed: Jun. 15, 1990

[30] Foreign Application Priority Data

Jun. 21, 1989 [GB] United Kingdom ............ 8914206
Jun. 23, 1989 [GB] United Kingdom ............ 8914421

[51] Int. Cl.$^5$ ............................................. E05D 15/16
[52] U.S. Cl. ........................................ 49/441; 49/484; 49/488; 49/491; 49/496
[58] Field of Search ............... 49/441, 440, 502, 491, 49/495, 484, 490, 496, 488

[56] References Cited

U.S. PATENT DOCUMENTS

| 4,010,573 | 3/1977 | Andrzejewski | 49/491 X |
| 4,107,898 | 8/1978 | Andrzejewski et al. | 49/490 X |
| 4,311,747 | 1/1982 | Kruschwitz | 49/490 X |
| 4,472,469 | 9/1984 | Thies | 49/496 X |
| 4,604,830 | 8/1986 | Maeda et al. | 49/440 X |
| 4,656,784 | 4/1987 | Brachmann | 49/440 X |
| 4,783,931 | 11/1988 | Kirkwood | 49/441 |
| 4,843,763 | 7/1989 | Mesnel | 49/440 |
| 4,875,307 | 10/1989 | Barbero | 49/440 X |
| 4,910,918 | 3/1990 | Naples et al. | 49/441 |

FOREIGN PATENT DOCUMENTS 0161685 11/1985 European Pat. Off. .
0164601 12/1985 European Pat. Off. .
0173239 3/1986 European Pat. Off. .
3512973 11/1985 Fed. Rep. of Germany .
2216936 10/1989 United Kingdom .

Primary Examiner—Philip C. Kannan
Attorney, Agent, or Firm—Leydig, Voit & Mayer

[57] ABSTRACT

A sealing strip for attachment to the window frame running around a window opening on a vehicle door is in two parts each made of extruded plastics or rubber material and incorporating metal reinforcements. One part fits over a flange forming part of the window frame and locks into a channel formed in the frame. This part also has a reinforced lip which defines a channel for receiving the window glass. The reinforcement enables this lip to be relatively thin, thus achieving a "flush glass" effect. The other extruded part embraces a flange and has a lip for sealing against the window glass.

15 Claims, 3 Drawing Sheets

SEALING STRIPS

BACKGROUND OF THE INVENTION

The invention relates to sealing strips and arrangements. Embodiments of the invention to be described in more detail below are in the form of sealing strips and sealing arrangements for use in vehicle body construction and, in particular, for sealing the movable panes of window glass in vehicle windows. In order to reduce drag and wind noise, it is desirable to ensure, so far as possible, that such panes of window glass are substantially flush with the adjacent vehicle bodywork in order to produce a so-called "flush glass" effect.

SUMMARY OF THE INVENTION

According to the invention, there is provided a sealing strip for a movable pane of window glass, comprising flexible material defining a channel for receiving the window glass, the wall on one side of the channel bearing against the window glass and being relatively thin compared with the thickness of the window glass and being reinforced with a generally planar metal reinforcement which in use overlaps the edge of the glass.

According to the invention, there is further provided a sealing arrangement for sealing a movable pane of window glass forming part of a vehicle door, comprising a metal frame attached to the door and defining the window opening and being in the form of a metal channel having the mouth of the channel facing outwardly of the vehicle with the distal part of the side wall of the channel on the peripherally outermost part of the frame defining a first flange extending outwardly of the vehicle and substantially normally to the plane of the window opening and with the distal part of the other side wall of the channel being bent to form a second flange extending substantially parallel to the plane of the opening and towards the centre of the opening, a sealing strip having first and second separate parts made of extruded plastics or rubber material, the first sealing strip part having a lip positioned on the outside of the vehicle and forming one side wall of a first, window pane receiving, channel running around at least part of the periphery of the window opening and also defining a second channel facing at right angles to the first channel and sized so as closely to embrace the first flange and thereby to support the first part of the sealing strip on the frame, the second sealing strip part made of extruded plastics or rubber material defining a third channel which closely embraces the second flange and supports a flexible sealing lip bearing against the inside face of the window glass, the lip of the first sealing strip part incorporating a generally planar metal reinforcement which is thin compared with the thickness of the pane of window glass and overlaps the edge of the window glass.

DESCRIPTION OF THE DRAWINGS

Sealing strips and sealing arrangements embodying the invention and for fitting around the window openings of vehicle doors will now be described, by way of example only, with reference to the accompanying diagrammatic drawing in which.

DESCRIPTION OF PREFERRED EMBODIMENTS

Figure 1:
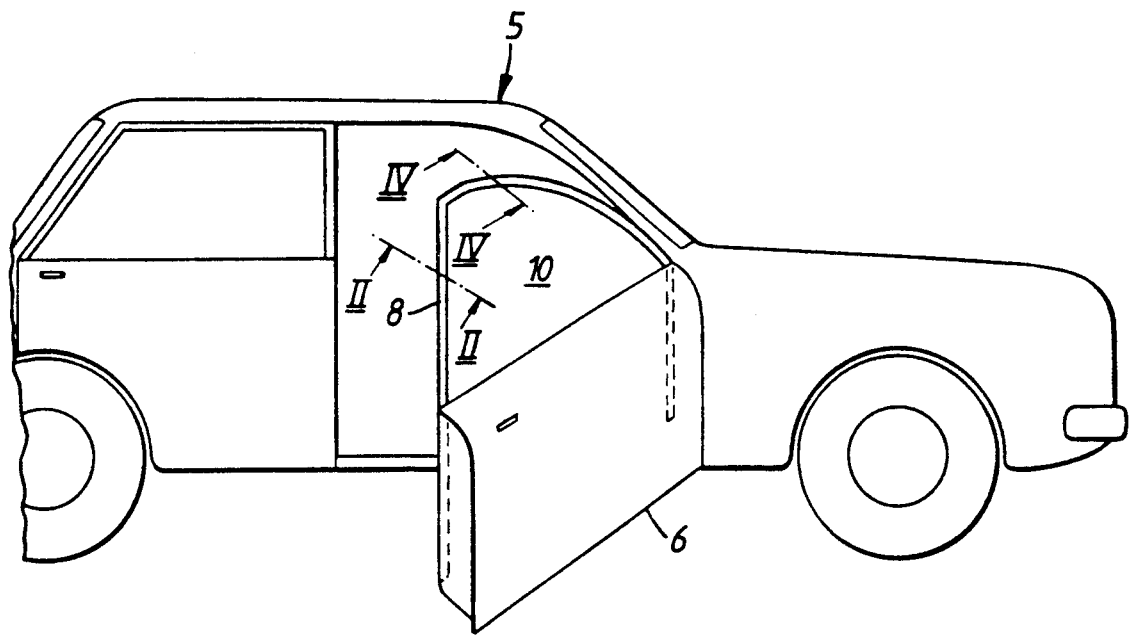
FIG. 1 is a pictorial view of part of a vehicle showing a door to which the sealing strip is fitted.
Figure 3:
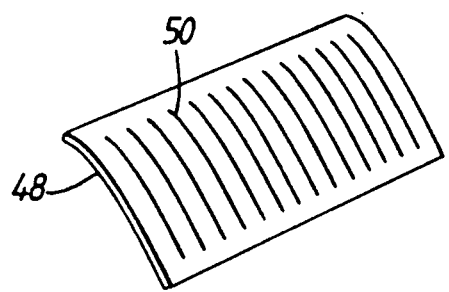
FIG. 3 is a perspective view of a metal reinforcement incorporated into the sealing strip.

The vehicle 5 (FIG. 1) has a door 6 with a window frame 8 defining a window opening 10. A pane of window glass is slidable in a vertical direction in the frame 8 so as to be lowerable into and raisable from the lower hollow part of the door 6.

The window frame 8 (FIG. 2) is in the form of a metal section 12 defining a channel 14 facing outwardly of the vehicle. A second metal section 16 is fitted into the channel 14 and welded to the metal section 12 to form flanges at 18 and 20. The metal section 16 defines a smaller channel 22 having a re-entrant part 23 extending partially across its mouth.

Figure 2:
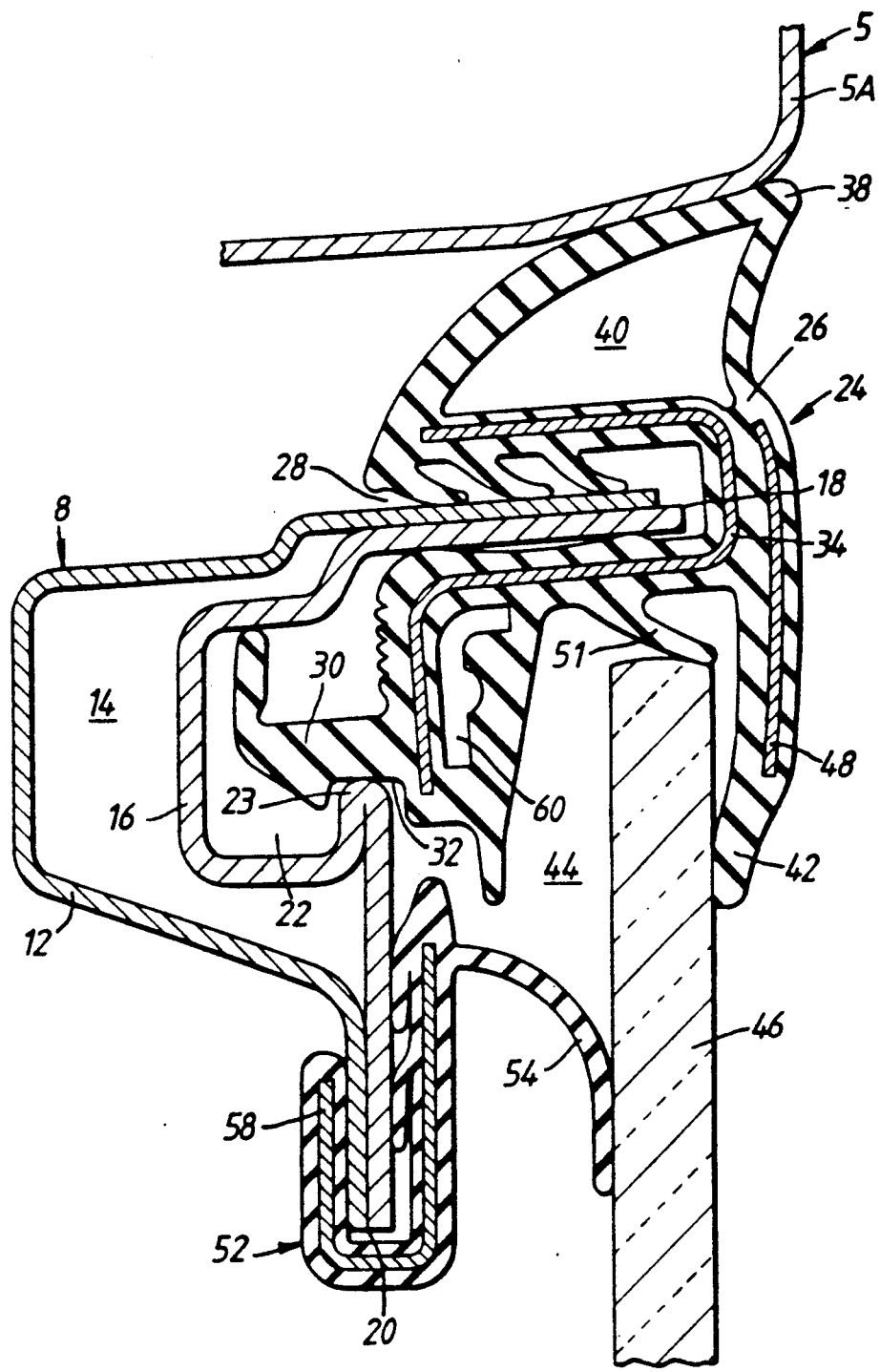
FIG. 2 is a cross-section on the line II—II of FIG. 1.

The sealing strip in the region of the "B" pillar of the vehicle is shown in FIG. 2 and is in two separate parts. The first part 24 is made of extruded rubber or plastics material 26. This defines a channel 28 which is sized to fit closely on the flange 18, and a protrusion 30 which fits within the channel 22 and has a groove 32 for locking over the metal part 23. In this way, the strip 24 is secured on the frame 8 and this is assisted by a metal reinforcement 34 which is embedded in the extruded material. The reinforcement 34 embraces the channel 28. The reinforcement 34 may be of any suitable form. It may be made of unapertured metal strip. Instead, however, it may incorporate slits or slots to increase its flexibility and could be in the form of completely separate side-by-side metal elements. Instead, it could be made of looped wire. Advantageously, however, the base of its channel is unapertured and the remainder is provided with parallel slits.

The extruded plastics or rubber material also extends to define a shoulder 38 which, when the door is closed, seals against the part 5A of the vehicle body 5 running along the top of the door opening. The shoulder 38 is adjacent to a hollow 40 in the extruded material which increases the flexibility of the shoulder 38.

On the outside of the vehicle body, the extruded material extends to form a lip 42 which is one wall of a channel 44 for receiving the window glass 46. The portion of the material defining the lip 42 is reinforced with a metal reinforcing strip 48 which is separate from the metal reinforcement 34. The metal reinforcing strip 48 can be provided with slits 50 as shown in FIG. 2. These slits better enable it to be bent as necessary to follow curves in the window frame and the above-mentioned slits advantageously provided in the reinforcement 34 are for the same purpose.

At its base, the channel 44 is provided with a lip 51 in contact with the glass 46.

The channel 44 is significantly larger in width than the thickness of the window pane 46, and the positioning of latter in the channel 44 is assisted by a second part 52 of the sealing strip. The part 52 is made of extruded plastics or rubber material and is generally channel-shaped so as to be a close fit on the flange 20. However, one of its walls is extended to provide a flexible lip 54 bearing against the inside face of the window pane 46. The part 52 incorporates metal reinforcement 58 which may be of the same general type as the metal reinforcement 34.

The extruded plastics or rubber material of each of the parts 24,52 may be extruded so that it is not of constant hardness/softness throughout. For example, the shoulder 38 and the lips 42 and 51 may be extruded so as to be softer than the remainder of the material of the part 24, and the lip 54 may be extruded so as to be of softer material than the remainder of the part 52.

The surfaces of the lips 42,51 and 54 engaging the window pane 46 may be flocked or otherwise treated to provide relatively low friction.

The incorporation of the metal reinforcing strip 48 in the lip 42 considerably strengthens that lip and enables it to be relatively thin. In this way, a desirable "flush glass" effect is produced.

Figure 4:
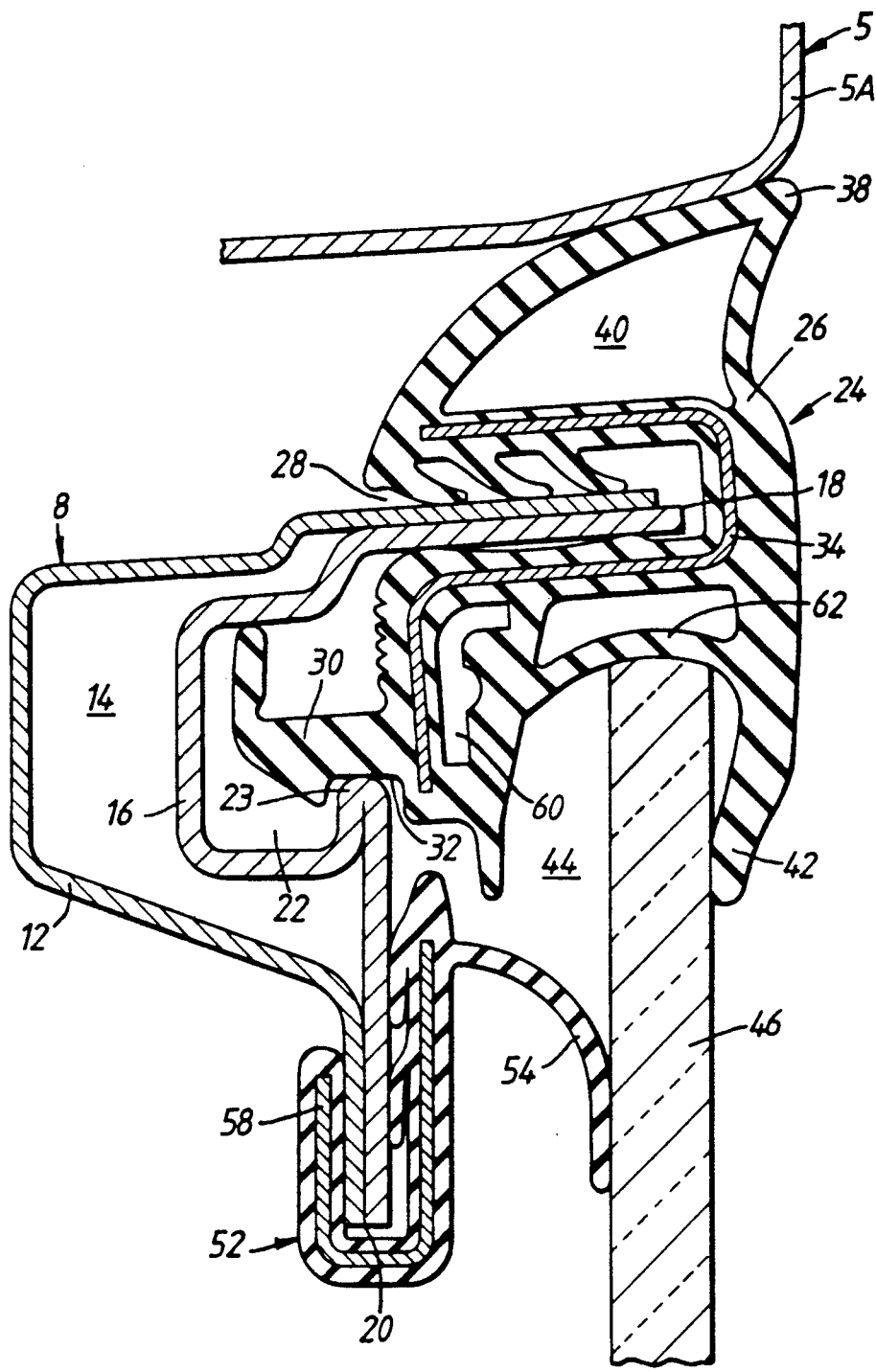
FIG. 4 is a cross-section on the line IV—IV of FIG. 1.

The sealing strip along the top and front of the door is shown in FIG. 4 and like the strip of FIG. 2, is in two parts. Items in FIG. 4 corresponding to those in FIG. 2 are similarly referenced. The strip of FIG. 4 differs from that of FIG. 2 in that it omits the reinforcement 48. In addition, the lip 51 is omitted and replaced by a web 62. These differences enable the lip 42 to provide a relatively wide mouth for receiving the approaching window glass 46, the latter's pressure on the web 62 then pulling the lip 42 into contact with the window glass as shown in FIG. 4. Such a feature is not required for the strips shown in FIG. 2 because the window glass is continuously in position within the channel 44.

The sealing strips shown in FIGS. 2 and 4 may be integrally extruded. Instead they may be joined together to form a mitred corner, at the right angled junction between them, by cutting respective lengths of the two sealing strips (each incorporating parts 24 and 52) at angles of 45 degrees approximately and then securing them together with adhesive or in a mould. A suitably angled metal reinforcing piece may be incorporated into the two parts 24 at the corner for strengthening purposes, such metal part being introduced in the void 60 (FIG. 2) of each of the two parts 24. Less sharp bends or curves may be produced by subjecting a length of the sealing strip to a "stretch-bending" process. This is made easier by the fact that the reinforcement 48 is separate from the reinforcement 34.

The reinforcement 48, being provided with very thin slits only, improves the external appearance of the sealing strip because it reduces the extent to which slots in the reinforcement 34 may produce ripples in the external surface of the extruded material.

What is claimed is:

1. A sealing strip for a movable pane of window glass, comprising flexible material defining a channel for receiving the window glass, the flexible material forming the wall on one side of the channel bearing against the window glass and being relatively thin compared with the thickness of the window glass and having embedded therein a strip of metal which is wholly generally planar and of sufficient gauge to act as a reinforcement for the wall, the wall and the embedded strip overlapping the edge of the glass in the channel.

2. A sealing strip according to claim 1, in which the said metal strip comprises a longitudinally extending strip having parallel slits extending partly across its width.

3. A strip according to claim 1, comprising a frame for the window and defining a flange, and in which the flexible material defines a further channel for closely embracing the flange.

4. A sealing strip according to claim 3, in which the window frame defines a channel spaced from the said flange and in which the flexible material has an extended part which is spaced from the further channel of the flexible material and is locked within the channel defined in the window frame.

5. A sealing strip according to claim 3, including a further metal strip embedded within the flexible material for reinforcing it and which is separate from and spaced from the first-mentioned metal strip.

6. A sealing strip according to claim 5, in which the further metal strip includes a channel-shaped part which embraces the further channel in the flexible material.

7. A sealing strip according to claim 1, in which the flexible material is integral with a sealing part for sealingly bearing against a part surrounding the window opening.

8. A sealing strip according to claim 1, including a separate part made of flexible material and which is supported so as to bear sealingly against the face of the window pane opposite to the face against which the said wall bears.

9. A sealing strip according to claim 8, including a frame for the window and defining a flange, and in which the separate part is attached to a further flange of the window frame but spaced from the first-mentioned flange.

10. A sealing strip according to claim 9, in which the separate part incorporates metal reinforcement.

11. A sealing strip according to claim 1, in which the metal strip is omitted from part only of the length of the said wall.

12. A sealing arrangement for sealing a movable pane of window glass forming part of a vehicle door, comprising a metal frame attached to the door and defining the window opening and being in the form of a metal channel having the mouth of the channel facing outwardly of the vehicle with the distal part of the side wall of the channel on the peripherally outermost part of the frame defining a first flange extending outwardly of the vehicle and substantially normally to the plane of the window opening and with the distal part of the other side wall of the channel being bent to form a second flange extending substantially parallel to the plane of the opening and towards the centre of the opening, a sealing strip having first and second separate parts made of extruded plastics or rubber material, the first sealing strip part having a lip positioned on the outside of the vehicle and forming one side wall of a first, window pane receiving, channel running around at least part of the periphery of the window opening and also defining a second channel facing at right angles to the first channel and sized so as closely to embrace the first flange and thereby to support the first part of the sealing strip on the frame, the second sealing strip part being made of extruded plastics or rubber material and defining a third channel which closely embraces the second flange and supports a flexible sealing lip bearing against the inside face of the window glass, the lip of the first sealing strip part incorporating a generally planar metal reinforcement which is thin compared with the thickness of the pane of window glass and overlaps the edge of the pane of window glass.

13. A sealing arrangement according to claim 12, in which the frame includes a further metal channel secured within the first-mentioned metal channel, the further metal channel lockingly engaging an extension of the plastics or rubber material of the first sealing strip part.

14. A sealing arrangement according to claim 12, in which the metal reinforcement of the lip of the first sealing strip part is in the form of a longitudinally extending metal strip having a plurality of substantially parallel slits extending partway across its width.

15. A sealing arrangement according to claim 12, including a further metal reinforcement embedded in the plastics or rubber material of the first sealing strip part, this further metal reinforcement being separate from and spaced from the first-mentioned metal reinforcement and including a channel-shaped region which embraces the second channel therein.

* * * * *